(12) United States Patent
Shihadeh

(10) Patent No.: US 8,001,363 B2
(45) Date of Patent: Aug. 16, 2011

(54) SYSTEM FOR SPECULATIVE BRANCH PREDICTION OPTIMIZATION AND METHOD THEREOF

(75) Inventor: Elias Shihadeh, Longmont, CO (US)

(73) Assignee: GlobalFoundries Inc.

( * ) Notice: Subject to any disclaimer, the term of this patent is extended or adjusted under 35 U.S.C. 154(b) by 1461 days.

(21) Appl. No.: 11/098,153

(22) Filed: Apr. 4, 2005

(65) Prior Publication Data
US 2006/0224872 A1    Oct. 5, 2006

(51) Int. Cl.
*G06F 7/38* (2006.01)
*G06F 9/00* (2006.01)
*G06F 9/44* (2006.01)

(52) U.S. Cl. ........................... 712/239; 712/233
(58) Field of Classification Search ............. 712/239
See application file for complete search history.

(56) References Cited

U.S. PATENT DOCUMENTS

| | | | |
|---|---|---|---|
| 5,553,255 A * | 9/1996 | Jain et al. | 712/235 |
| 6,574,727 B1 | 6/2003 | Davidson et al. | |
| 6,691,220 B1 | 2/2004 | Guthrie et al. | |
| 6,728,873 B1 | 4/2004 | Guthrie et al. | |
| 6,748,522 B1 | 6/2004 | Gregoire et al. | |
| 2002/0053038 A1 * | 5/2002 | Buyuktosunoglu et al. | 713/320 |

FOREIGN PATENT DOCUMENTS
WO    9914667 A1    3/1999

OTHER PUBLICATIONS

"Algorithm for Instruction Cache Arbitration Among Multiple Instruction Streams," IBM Technical Disclosure Bulletin, vol. 39., No. 8, Aug. 1996, pp. 113-116.
"Dealer Instruction Processing Unit Governor—Determining the Segment Switch Depth," IBM Technical Disclosure Bulletin, vol. 36, No. 06A, Jun. 1993, pp. 235-236.

* cited by examiner

*Primary Examiner* — Eddie Chan
*Assistant Examiner* — George D Giroux

(57) ABSTRACT

A value representative of a processor's speculative branch prediction efficiency is determined and the speculative branch prediction depth is adjusted accordingly. The processor's speculative branch prediction efficiency may be represented by the average number of clocks per instruction (CPI), whereby an increase in the average CPI indicates that the processor is becoming less efficient due to incorrectly predicted speculative branch predictions and, conversely, a decrease indicates that the processor has a higher ratio of properly predicted speculative branch predictions. Thus, when the processor is more effectively predicting speculative branch predictions, the available speculative branch prediction depth for the processor may be increased to take advantage of this increased efficiency, and when the processor is less effectively predicting speculative branch predictions, the available speculative branch prediction depth may be decreased to reduce or minimize the processing cycles and power used by the processor in pursuing erroneous speculative branch predictions.

20 Claims, 3 Drawing Sheets

SYSTEM FOR SPECULATIVE BRANCH PREDICTION OPTIMIZATION AND METHOD THEREOF

FIELD OF THE DISCLOSURE

The present disclosure is directed to speculative branch prediction techniques, and more particularly to techniques for adaptive speculative branch prediction optimization.

BACKGROUND

Branch prediction techniques are frequently used in processors and other processing devices to enhance the performance of the processor. One type of branch prediction includes the speculative branch prediction whereby after a first conditional branch prediction is made, one or more speculative branch predictions may be made prior to resolution of the first conditional branch prediction, wherein the number of speculative branch predictions made is referred to the available speculative branch prediction depth. Speculative branch predictions often are advantageous in that if the conditional branch prediction preceding a speculative branch prediction is taken, the speculative branch prediction becomes a conditional branch prediction and instructions related to the new conditional branch prediction are already pre-fetched and available for execution by the pipeline of the processor. This results in a full utilization of the pipeline of the processor, thereby preventing stalls of the processor. However, speculative branch predictions may be disadvantageous in that if the first conditional branch prediction is not taken, the pipeline has wasted both time and power in pre-fetching and loading the instructions related with the speculative branch prediction into a cache and/or the pipeline itself. As a result, the processor also must expend energy and time forcing the pipeline and removing or ignoring data resulting from the execution of the erroneously predicted branch.

Accordingly, conventional processing devices may utilize a predetermined available speculative branch prediction depth in an attempt to achieve an optimal balance between the advantages and disadvantages of speculative branch prediction. However, as the speculative branch prediction hit/miss rate and the average number of conditional branches is highly application specific, the selection of any particular predefined available speculative branch prediction depth often proves sub-optimal for some or all of the applications executed by the processor. Accordingly, a system and method for adaptive speculative branch prediction depth optimization would be advantageous.

DETAILED DESCRIPTION OF THE DRAWINGS

FIGS. 1-4 illustrate various systems and techniques for adaptive optimization of speculative branch prediction in processors and other processing devices. In accordance with at least one embodiment of the present disclosure, a value representative of a processor's speculative branch prediction efficiency is determined and the speculative branch prediction depth is adjusted in accordance with the efficiency value. The processor's speculative branch prediction efficiency may be represented by, for example, the number of clocks per instruction (CPI), whereby an increase in the CPI indicates that the processor is becoming less efficient due to incorrectly predicted speculative branch predictions and, conversely, a decrease in the CPI indicates that the processor has a higher ratio of properly predicted speculative branch predictions. Thus, when the processor is executing an application whereby the processor is more effectively predicting speculative branch predictions, the available speculative branch prediction depth for the processor may be increased to take advantage of this increased efficiency, and when the processor is less effectively predicting speculative branch predictions, the available speculative branch prediction depth may be decreased so as to reduce or minimize the processing cycles and power used by the processor in pursuing erroneous speculative branch predictions.

Figure 1:
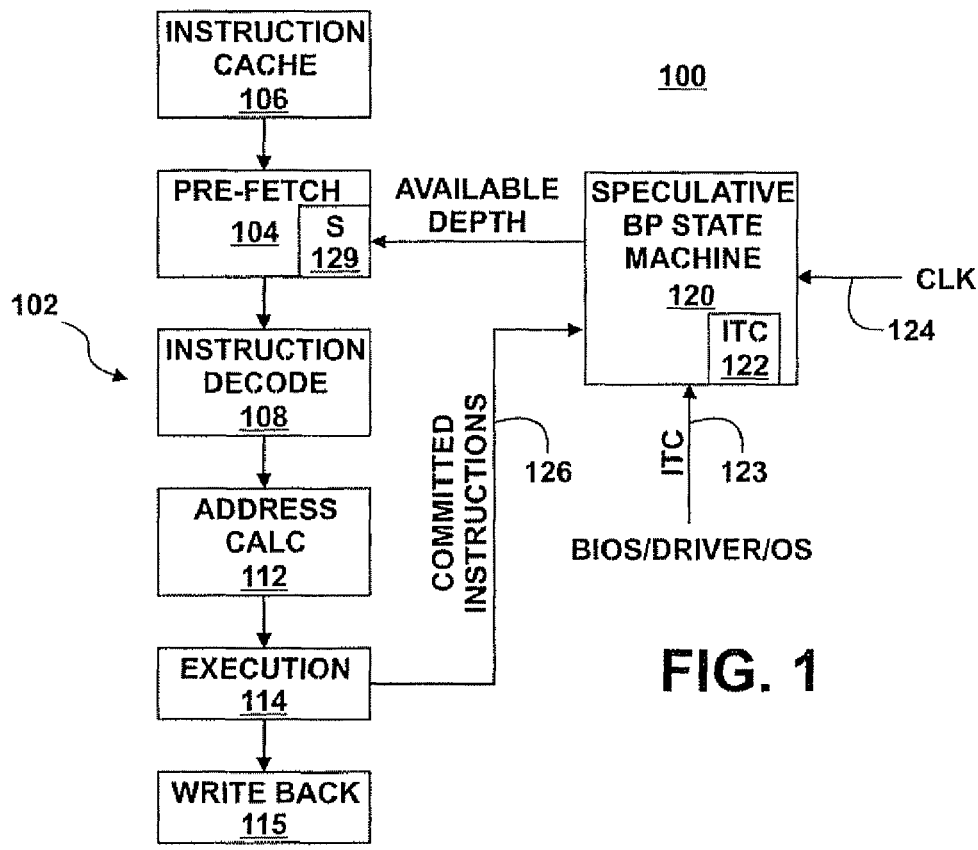
FIG. 1 is a block diagram of an exemplary processing device utilizing adaptive speculative branch prediction depth optimization in accordance with at least one embodiment of the present disclosure.

Referring now to FIG. 1, an exemplary processing device 100 utilizing an adaptive speculative branch prediction depth optimization technique is illustrated in accordance with at least one embodiment of the present disclosure. The processing device 100 comprises a pipeline 102 having a pre-fetch module 104 coupled to an instruction cache 106. As illustrated, the pipeline 102 further may comprise an instruction decode module 108, an address calculation module 112, an execution module 114, a write back module 115, and the like. The processing device 100 further comprises a speculative branch prediction state machine 120 coupled to at least the pre-fetch module 104 and the execution module 114.

The speculative branch prediction state machine 120, in at least one embodiment, is operable to dynamically adjust the available speculative branch prediction depth available to the pre-fetch module 104 based on one or more values determined to be representative of the processor's speculative branch prediction efficiency. In one embodiment, the average clocks per instruction, or CPI, is utilized by the speculative branch prediction state machine 120 as a representation of the processor's speculative branch prediction efficiency, and from this CPI value the state machine 120 may determine a new speculative branch prediction depth for use by the pre-fetch module 104 or may adjust a preexisting speculative branch prediction depth for use by the pre-fetch module 104.

Figure 2:
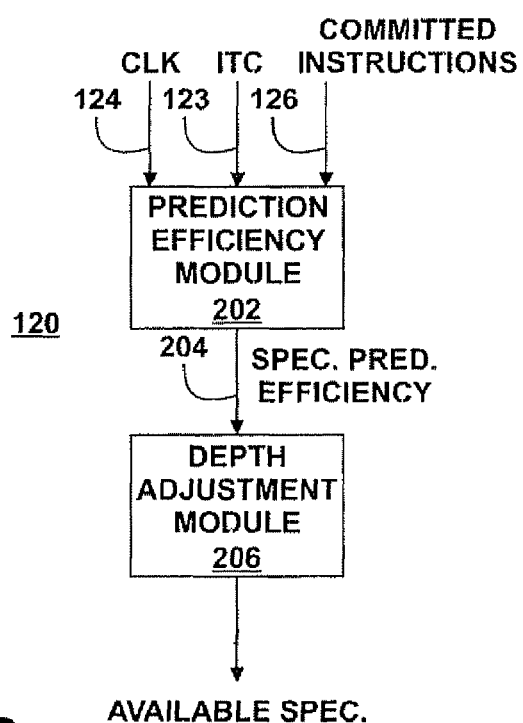
FIG. 2 is a block diagram illustrating an exemplary speculative branch prediction state machine of the processing device of FIG. 1 in accordance with at least one embodiment of the present disclosure.

Referring now to FIG. 2, the state machine 120 is illustrated in greater detail. In the illustrated example, the state machine 120 comprises a prediction efficiency module 202 coupled to a depth adjustment module 206. The prediction efficiency module 202 includes inputs to receive a periodic signal, such as pipeline clock 124, an input to receive an indication or representation of the number of instructions to count (ITC) for the current instruction cycle (ITC signal 123) and a signal 126 received from the execution module 114, where the execution module 114 asserts the signal 126 or provides a particular value as signal 126 when an instruction has been committed by the execution module 114. By using the pulses of the clock signal 124 and a count of committed instructions derived from signal 126, the prediction efficiency module 202 may determine an average CPI for an instruction cycle defined by the ITC signal 123. This average CPI may be output as signal 204 to the depth adjustment module 206 as an indication of the processor's speculative branch prediction efficiency for the instruction cycle. Based upon the average CPI output at signal 204, the depth adjustment module 206 may determine whether to increment or decrement the speculative branch prediction depth available to the pre-fetch module 104, wherein the available depth may be decremented when the average CPI for the current instruction cycle is greater than the average CPI for the previous instruction cycle, and conversely, the depth adjustment module 206 may increment the available speculative branch prediction depth for use by the pre-fetch module 104 when the average CPI of the current instruction cycle is less than the average CPI of a previous instruction cycle. Alternatively, the depth adjustment module 206 may determine a new available speculative branch prediction depth value for use by the pre-fetch module 104 based on a comparison of the CPI value to one or more thresholds. Thus, the depth adjustment module 206 may dynamically adjust the available speculative branch prediction depth based upon a comparison of the average CPI for one instruction cycle with the average CPI of a previous instruction cycle so as to gauge the effectiveness of the speculative branch prediction depth in use for a given application.

Figure 3:
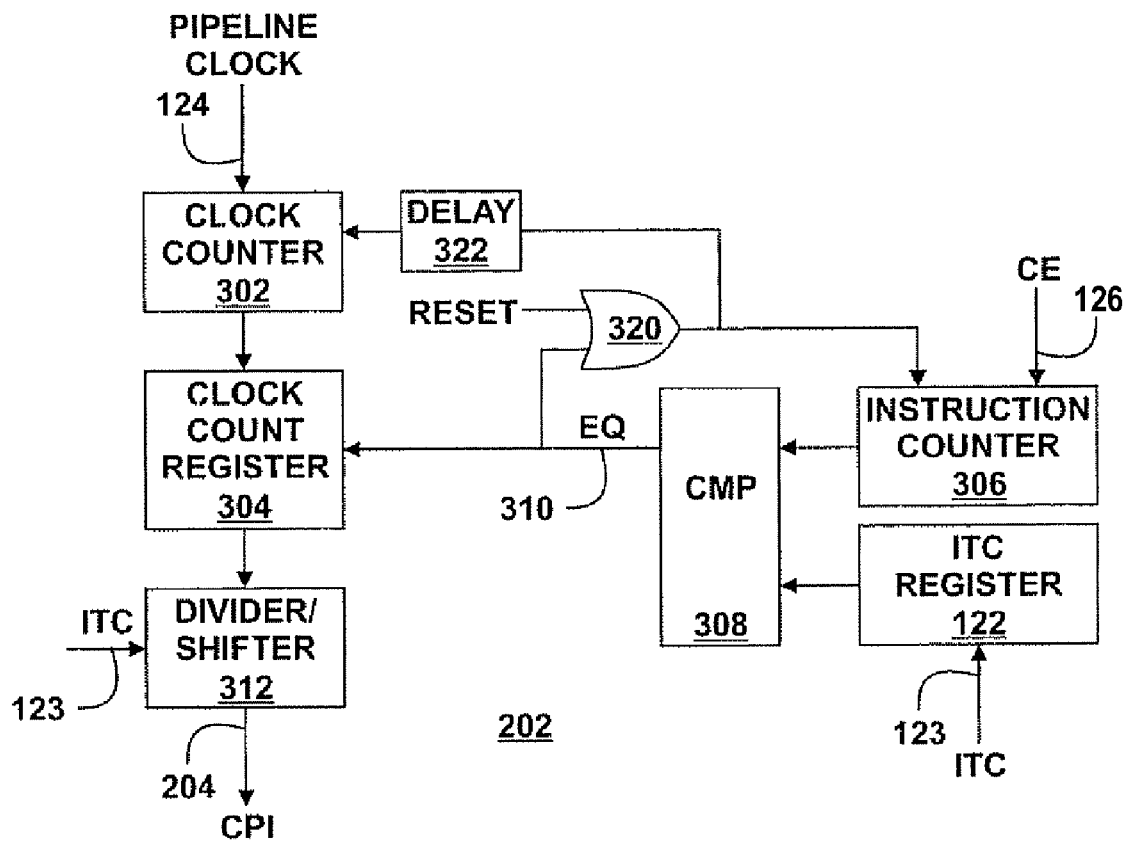
FIG. 3 is a block diagram illustrating an exemplary prediction efficiency module in accordance with at least one embodiment of the present disclosure.

Referring now to FIG. 3, an exemplary implementation of the prediction efficiency module 202 is illustrated in accordance with at least one embodiment of the present disclosure. The module 202 comprises a clock counter 302, a clock count register 304, an instruction counter 306, a compare module 308, a divider 312, a delay element 322, an OR gate 320, and the ITC register 122. The clock counter 302 includes an input to receive the pipeline clock 124 and an output coupled to the input of the clock count register 304. The clock counter register 304 further comprises a second input coupled to the output of the compare module 308, and an output coupled to the input of the divider 312. The instruction counter 306 comprises an input to receive the committed instruction signal 126 and an output coupled to a first input of the compare module 308. The compare module further comprises a second input coupled to an output of the ITC register 122. As noted above, the ITC register 122 may be loaded with the ITC value which may be provided as ITC signal 123 via, for example, a software driver or operating system.

In operation, at the beginning of an instruction cycle the clock counter 302 and instruction counter 306 are reset via, e.g., a reset signal provided via the OR gate 320. The clock counter 302 then increments upon each pulse of the pipeline clock 124. Similarly, the instruction counter 306 increments each time the committed instruction signal 126 is asserted by the execution module 114 so that the instruction counter 306 represents the present number of instructions committed by the execution module 114 during the present instruction cycle. The present value of the instruction counter 306 is provided to the compare module 308, as is the ITC value stored in the ITC register 122. When these values are equal, or substantially equal, the compare module 308 asserts an equal signal 310, thereby indicating that the number of instructions committed by the execution module 114 is equal, or substantially equal, to the number of instructions to count directed by the operating system or software driver. The clock count register 304, in one embodiment, stores the present number of clock cycles or pulses determined by the clock counter 302 from the pipeline clock 124 during the present instruction cycle. In response to the assertion of the equal signal 310, the clock count register 304 outputs the present clock count to the divider 312. The divider 312 divides the clock count for the present instruction cycle by the number of instructions to count (ITC) to determine the average number of clocks per instructions (CPI) for those instructions committed by the execution module 114 during the present instruction cycle. In one embodiment, the divider 312 is implemented as a shifter having as a shift right input the ITC signal 123. A representation of the determined average CPI may be output as signal 204.

Figure 4:
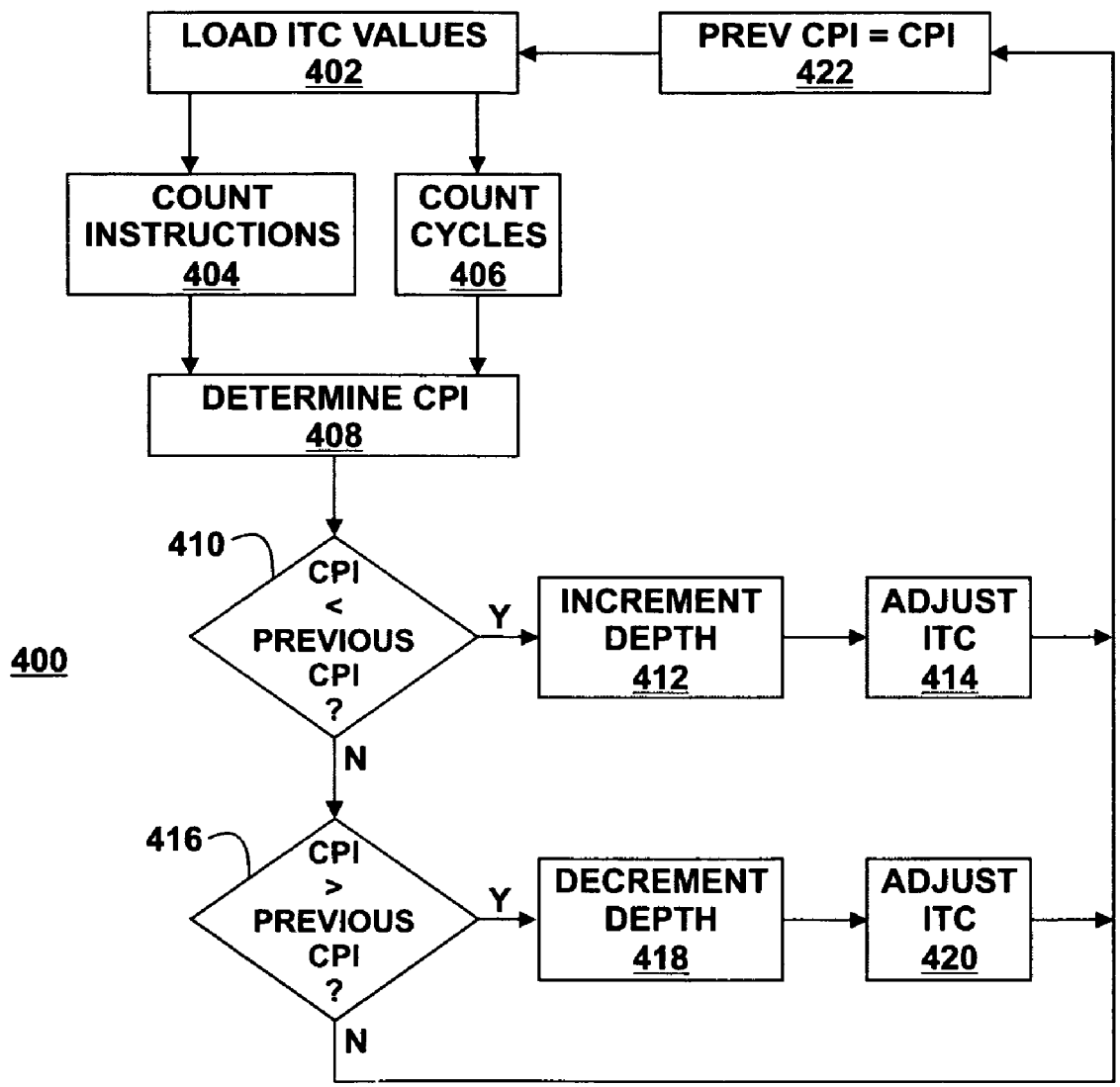
FIG. 4 is a flow diagram illustrating an exemplary method for determining an optimal speculative branch prediction depth in accordance with at least one embodiment of the present disclosure.

Referring now to FIG. 4, an exemplary method for adjusting the available speculative branch prediction depth for use by the processor 100 based on the average CPI for one or more instruction cycles is illustrated in accordance with at least one embodiment of the present disclosure. The method 400 initiates at block 402, wherein the ITC value or values representative of the number of instructions to be counted for a particular instruction cycle are loaded into, for example, the ITC register 122. At block 404, the number of instructions committed by the execution module 114 are counted for the present instruction cycle. At block 406, the number of pulses or cycles of the pipeline clock 124 are counted. At step 408, the average CPI for the instruction cycle is determined based on a ratio of the number of cycles counted at block 406 to the number of committed instructions counted at block 404. At block 410, the average CPI of the present instruction cycle is compared to the average CPI of the previous instruction cycle. A situation where the average CPI of the present instruction cycle is less than the average CPI of a previous instruction cycle may be interpreted as an indication that the speculative branch predictions of the processor 110 are, or are becoming, more effective and the available speculative branch prediction depth utilized by the pre-fetch module 104 therefore may be incremented by a certain value at block 412. For example, the depth may be incremented by a fixed increment (e.g., incremented by one), by a particular percentage (e.g., increment the speculative branch prediction by 20%) or the like.

The number of instructions to count (i.e., the value of ITC) is representative of the duration over which the average CPI is calculated and therefore may be factor in the resulting average CPI. For example, if the ITC value is less than the number of instructions in, for example, a tight loop, the average CPI value may be calculated as artificially low due to the execution of the tight loop. Likewise, an ITC value that is too large may result in an estimate average CPI value that is not completely reflective of the processor's branch prediction efficiency. Accordingly, if the current average CPI is less than the previous average CPI, the ITC value may be decreased at block 414 so as to refine the duration over which the average CPI is calculated for the next instruction cycle. To illustrate, after confirming that the present ITC value is greater than a predefined minimum ITC value, the ITC value may be reduced by half by, for example, shifting the value in the ITC register 122 right one bit.

Instances in which the average CPI of the current instruction cycle is greater than the average CPI of the previous instruction cycle (block 416) may be interpreted as an indication that the processor is or is becoming less effective in its speculative branch predictions. Accordingly, the available branch prediction depth may be decremented by a certain amount at block 418 so as to reduce the number of speculative branch predictions that the pre-fetch module 104 may take, and therefore reduce or minimize the wasted processor cycle time and power consumption resulting from missed speculative branch predictions. Moreover, it may be that the current ITC value represents an insufficient number of instructions over which an appropriate average CPI value may be determined. Accordingly, at block 420 the current ITC value may be increased to increase the number of instructions counted during the next cycle. For example, after confirming that the ITC value is less than a predefined maximum ITC value, the current ITC value may be increased to double its size by, for example, shifting the value in the ITC register 122 left one bit.

For the next instruction cycle, the once current average CPI is set to be the previous average CPI at block 422 and the method 400 may be repeated for the next instruction cycle. Accordingly, it will be appreciated that repeated iterations of method 400 result in a dynamic tuning of the available speculative branch prediction depth used by the pre-fetch module 104 so as to adjust for variations in the effectiveness of speculative branch predictions made by the processor as well as variations in the cost of erroneous speculative branch predictions that are often highly application-dependent.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   quantifying a number of periodic pulses occurring during an execution of one or more instructions by a processor; and
   adjusting an available depth of branch predictions based on a comparison of the number of periodic pulses to a predefined value.

2. The method as in claim 1, wherein quantifying the number of periodic pulses comprises determining a ratio of pulses per instruction.

3. The method as in claim 1, wherein quantifying the number of periodic pulses comprises determining a number of periodic pulses for a predefined number of instructions.

4. The method as in claim 3, further comprising adjusting the predefined number of instructions in response to adjusting the available depth of branch predictions.

5. The method as in claim 4, wherein adjusting the predefined number of instructions includes increasing the predefined number of instructions in response to decreasing the available depth of branch predictions.

6. The method as in claim 5, wherein adjusting the predefined number of instructions includes decreasing the predefined number of instructions in response to increasing the available depth of branch predictions.

7. The method as in claim 6, wherein the predefined number of instructions is maintained within a range set by a predefined minimum number of instructions and a predefined maximum number of instructions.

8. The method as in claim 1, wherein the branch predictions comprise speculative branch predictions.

9. A system comprising:
   a first portion operable to quantify an instruction execution efficiency of a processor; and
   a second portion to adjust an available speculative branch prediction depth based upon the instruction execution efficiency.

10. The system as in claim 9, wherein the first portion has a first input to receive a periodic signal, a second input to receive an instruction count signal that is asserted in response to an execution of an instruction and an output to provide a first representation of a number of pulses of the periodic signal compared to a number of instructions executed, wherein the first representation is representative of the instruction execution efficiency.

11. The system as in claim 10, wherein the first portion further comprises a third input to receive a representation of a number of executed instructions to count and wherein the first representation represents a ratio of a number of pulses of the periodic signal per executed instruction over a period of executed instructions equal to the number of executed instructions to count.

12. The system as in claim 11, wherein the first portion further comprises:
   a first counter having an input coupled to the periodic signal and an output to provide a representation of a pulse count of the periodic signal;
   a second counter having an input coupled to the instruction count signal and an output to provide a representation of a count of executed instructions based on the instruction count signal;
   a first register having an output to provide the representation of the number of executions to count;
   a comparator having a first input coupled to the second counter, a second input coupled to the output of the first register, and an output to provide an asserted signal when the first input and the second input are substantially equivalent;
   a second register having a first input coupled to the output of the first counter, a second input coupled to the output of the comparator, and an output to provide the representation of the pulse count in response to the asserted signal provided by the comparator; and
   a shifter having a first input to receive the representation of the number of executions to count, a second input coupled to the output of the second register, and an output to provide a representation of a number of pulses per instruction based on the representation of the number of executions to count and the representation of the pulse count, wherein the output of the shifter represents the instruction execution efficiency.

13. The system as in claim 10, wherein the second portion has a first input to receive the first representation and an output to provide a representation of the adjusted available speculative branch prediction depth based on the first representation, wherein the adjustment of the available speculative branch prediction depth is substantially inverse to a change in the first representation.

14. A processing device comprising:
   a pipeline comprising:
   a prefetch module comprising a first input coupled to an instruction cache and a first register to store a value representative of an available branch prediction depth, wherein the available branch prediction depth represents a maximum number of speculative branch predictions to be performed by the prefetch module; and
   an execution module operable to execute one or more instructions, the execution module having an output to provide an asserted signal in response to an execution of an instruction; and
   a speculative branch predict module comprising:
   a first counter having an input coupled to a periodic signal and an output to provide a representation of a pulse count of the periodic signal;
   a second counter having an input coupled to the output of the execution module and an output to provide a representation of a count of executed instructions;
   a second register having an input to receive a representation of a number of executions to count and an output to provide the representation of a number of executions to count;

a comparator having a first input coupled to the second counter, a second input coupled to the output of the second register, and an output to provide an asserted signal when the first input and the second input are substantially equivalent;

a third register having a first input coupled to the output of the first counter, a second input coupled to the output of the comparator, and an output to provide the representation of the pulse count in response to the asserted signal provided by the comparator;

a shifter having a first input to receive the representation of the number of executions to count, a second input coupled to the output of the third register, and an output to provide a representation of a number of pulses per instruction based on the representation of the number of executions to count and the representation of the pulse count; and a depth adjustment module having a first input coupled to the output of the shifter and an output coupled to the input of the first register, wherein the depth adjustment module is operable to:

provide at the output a first value for storage in the first register, the first value representative of the available speculative branch prediction depth, wherein the depth adjustment module is further operable to adjust the first value between cycles of instructions based on a comparison of a first number of pulses per instruction received from the shifter for a first cycle of instructions to a second number of pulses per instruction received from the shifter for a second cycle of instructions subsequent to the first cycle of instructions.

15. The processing device as in claim 14, wherein the depth adjustment module increments the first value when the first number of pulses per instruction is less than the second number of pulses per instruction.

16. The processing device as in claim 15, wherein the depth adjustment module decrements the first value when the first number of pulses per instruction is greater than the second number of pulses per instruction.

17. The processing device as in claim 16, wherein the depth adjustment module further comprises a second output coupled to the input of the second register to provide the representation of the number of instructions to count for storage by the second register, and wherein the depth adjustment module is further operable to adjust the number of instructions to count based on the comparison of the first number of pulses per instruction to the second number of pulses per instruction.

18. The processing device as in claim 17, wherein the depth adjustment module is operable to:

reduce the number of instructions to count when the first number of pulses per instruction is less than the second number of pulses per instruction; and increase the number of instructions to count when the first number of pulses per instruction is less than the second number of pulses per instruction.

19. The processing device as in claim 18, wherein the depth adjustment module is further operable to maintain the number of instructions to count within a range comprising a minimum number of instructions to count and a maximum number of instructions to count.

20. The processing device as in claim 18, wherein the depth adjustment module is operable to reduce or increase the number of instructions to count by right shifting or left shifting, respectively, a value representative of the number of instructions to count.

* * * * *